Patented Apr. 21, 1931

1,802,298

UNITED STATES PATENT OFFICE

PAUL G. WILLETTS, OF WEST HARTFORD, CONNECTICUT

REFRACTORY

No Drawing.  Application filed March 14, 1927. Serial No. 175,436.

My invention relates to composite refractories of the general type composed of a grog and a binder. Its object is to provide a new and improved system of preparing refractories of greater rigidity and permanence of shape at high temperatures, greater mechanical strength, and greater resistance to changes in temperature, than any such refractories which have heretofore been produced.

My invention is based upon the fundamental principle of preparing a refractory body from a grog assembled with a binder which has greater refractoriness than the grog. This is believed to be broadly new with the present invention.

A further object of my invention is to provide new refractories having the superior properties mentioned above, from inexpensive materials and by simple manipulations that are well-known in the refractory art.

It is very common to make refractories by assembling a previously burned grog with a binding material, shaping the assembly into the bricks or shapes desired, and burning the articles so produced. In every case prior to my present invention, so far as I am aware, the binder has been less refractory than the grog or, at most, of equal refractoriness with the grog. This has been the natural result of the former theory underlying the production of refractories by the grog system, according to which the grog has been relied upon to supply the necessary refractoriness and mechanical strength, and the binder has been employed mainly for the purpose of sticking together the particles of the grog. The grog has been commonly called the "skeleton" of the refractory body, and is thus considered to be the hard, rigid and heat-resisting component. It has been considered necessary to keep the amount of binder as low as possible, so as not to harm the product.

I have discovered that refractory bodies of superior rigidity under high temperatures, and of superior mechanical strength, load-bearing capacity and resistance to changes in temperature, may be made from well-known ingredients by changing the emphasis in respect to refractoriness from the grog to the binder. Products prepared according to this invention are in the most favorable form to resist deformation at high temperatures, because the more refractory binder encloses the particles of the less refractory grog and the binder is interconnected throughout the mass of the product, producing a continuous structure that would remain strong and self-sustaining if the grog were absent. In an ordinary refractory body composed of grog and a less refractory binder, the grog particles, being discontinuous, are held against relative movement by the binder and by incidental friction between such particles of the grog as may be in contact with one another, and such an ordinary refractory body will fail at high temperatures as soon as the binder yields, and before the particles of the grog reach their softening point.

My invention also contemplates the provision of a composite refractory having a binder of greater refractoriness than the grog, in which both the grog and the binder are transformed, either wholly or in part, during the process of manufacture, into crystalline aluminum silicate and a glassy matrix. But the final material, even after complete transformation, is not uniform and homogeneous throughout its mass, as are the products of my other processes involving similar transformations described and claimed in my prior applications for Letters Patent, Serial No. 91,361, filed March 1, 1926, and Serial No. 147,848, filed November 11, 1926. In the present process there appears to be more or less inter-diffusion of glassy material between the grog particles and the binder during the aluminium silicate transformation, but the particles derived from the grog retain their existence as separate particles, though the original material may be completely transformed, and the particles derived from the grog have a system of crystals and glassy matrix different from the system of crystals and matrix derived from the binder. In the typical examples to be described below, the particles of the finished product derived from the grog contain crystals of aluminum silicate in a glassy matrix and have a considerable degree of refractoriness. The portions of the finished product derived from the binder are composed of a greater proportion of crystals of aluminum silicate in a glassy matrix which is of relatively small quantity as compared with the crystalline portion and as compared with the quantity of glassy matrix in the particles derived from the grog. Also, the glassy matrix derived from the binder is of substantially higher refractoriness than the glassy matrix derived from the grog. Therefore, the part of the product that is derived from the binder remains more refractory than the part derived from the grog. It is to be understood that the particles derived from the grog may not be sharply distinct from the portions derived from the binder, but that the two materials may blend somewhat into each other by reason of the inter-diffusion mentioned above. However, in spite of such diffusion, the binder derivative remains more refractory than the grog derivative.

The assembled material, before the final burning, consists of a burned clay grog in a more highly aluminous binder which may be composed entirely of diaspore or bauxite, or may be composed of clay enriched in alumina by the addition of diaspore or bauxite. The binding properties and mechanical strength of the binder are largely developed by the heat treatment, which produces a fine-grained structure of minute and interlocked aluminum silicate crystals in a small amount of highly silicious and refractory vitreous matrix. The particles derived from the grog, though less refractory than the portions derived from the matrix, are themselves very rigid at high temperatures.

In its broad aspect, my invention is not restricted to the use of specific materials for the grog or for the binder, but at present I prefer to employ a burned bauxitic clay as the grog and, for the binder, raw bauxitic clay with a small admixture of a raw hydrated aluminum oxid mineral, such as diaspore or bauxite. The clay is preferably one of the natural aluminous or bauxitic kaolins having sufficient plasticity for initial assembly and handling, such for example, as the Georgia clay known in the market as run-of-mine G. No. 1 kaolin, mined by the Savannah Kaolin Company of Savannah, Georgia.

Other clays may be used in preparing the burned grog, such as Cheltenham clay, flint clay, Burley flint clay and refractory plastic clays. The binder, instead of being composed of mixed bauxitic clay and diaspore or bauxite, may consist wholly of diaspore or bauxite, and other clays may be added to the grog or to the binder, provided that the refractoriness of the binder is not brought below the refractoriness of the grog. When the binder consists of clay mixed with diaspore or bauxite, the diaspore or bauxite counteracts the tendency of the raw clay to crack when heated.

In making one desirable refractory according to this invention, I grind raw bauxitic clay having sufficient plasticity to hold together in masses for working, such as the Georgia kaolin mentioned above, to impalpable fineness, such for example as to pass through a 325-mesh screen, and I form the ground clay into grog for making a subsequent final assembly. To make such grog, I prefer to add to the ground clay sufficient water for dry pressing, about 5% or 6% of moisture being sufficient for this purpose, and then dry-pressing the material under heavy pressure into shapes suitable for handling, these shapes being then burned to temperatures of the order of Cone 26 to Cone 30, corresponding to about 3002° F. to 3146° F.

During this burning operation, the grog shapes may be used as pallets to support finally assembled articles for the second burning referred to below. The calcined clay is then broken down to a suitable fineness for grog, such for example as a fineness of ¼ inch or finer.

To form a binder to be mixed with this grog, I prepare raw bauxitic clay, preferably the same kind of clay as that from which the grog is made, and a raw aluminous mineral such as diaspore, by grinding both materials to impalpable fineness and preferably to the same degree of fineness, in order that the binder may be homogeneous. A fineness of 325-mesh is suitable for this purpose.

I then make a final assembly, using the previously prepared materials mentioned above in suitable proportions to give the final products the desired composition. For example, the materials may be mixed in the following proportions:

| | Parts |
|---|---|
| Burned bauxitic clay grog | 60 |
| Raw ground bauxitic clay | 30 |
| Raw ground diaspore | 10 |

It will be observed that this assembly consists of 90% of raw and burned clay and 10% of raw diaspore. This amount of diaspore is sufficient to render the assembled and pressed material coherent before burning. Another suitable assembly consists of 70% of the burned clay grog and 30% of raw diaspore or raw bauxite.

The final assembly is thoroughly mixed and enough water is added for dry pressing, suitably between 5% and 12%. 8% of moisture is a typical amount for satisfactory pressing. The final assembly thus produced is dry-pressed into the desired shapes, such as blocks, bricks or tiles. These shapes are burned to an elevated temperature, which may be of the order of Cone 30 or Cone 31, corresponding at 3146° F. to 3182° F. During this burning the articles tend to shrink least at the bottoms of the articles. To correct this tendency and produce articles of accurate dimensions, I prefer to employ one of the burning methods described and claimed in my U. S. Patents No. 1,626,260 and No. 1,626,261, both granted April 26, 1927.

The calcination of the final shapes produces, both in the grog and in the binder, a transformation whereby crystals of aluminum silicate are formed in a glassy matrix. This transformation begins at about 2750° F. and becomes more rapid as the temperature is raised. Thus firing to a temperature of about 2800° F. produces a product which is transformed sufficiently to be well suited for some refractory uses, while firing to a temperature of 3000° F. or 3100° F. produces a more thoroughly transformed product, which is well suited for use under high temperatures and in contact with or in communication with molten glass. The latter product is characterized by great density, its bulk specific gravity being between 2.45 and 2.8, and being therefore greater than the specific gravity of molten commercial soda-lime flint glass. Its internal structure is characterized by the presence of non-communicating and exceedingly small voids enclosed by dense walls. This product is exceedingly resistant to the corrosive and erosive action of molten glass and may be made to consist wholly of crystalline aluminum silicate with relatively small amounts of vitreous slag serving as a matrix for the crystalline material in the grog particles and in the binder. This vitreous matrix is highly siliceous and is therefore very refractory and very resistant to changes in temperature.

I am advised that the exact constitution of the aluminum silicate crystals developed by this process, and in other processes involving heat treatment of clay bodies, has not been fully determined. They may consist of mullite ($3Al_2O_3.2SiO_2$) or of sillimanite ($Al_2O_3.SiO_2$). My invention is not concerned with this, but with the fact, demonstrated by practical use of this process and by microscopic examination of the products, that these products have a structure of minute aluminum silicate crystals so interlocked and associated with refractory vitreous matrix material as to give superior results in use.

In the product specifically described above, the binder contains an excess of alumina over the theoretical mullite ratio and consequently there is no surplus silica in the binder to react with the grog and produce any substantial amount of additional glassy matrix unless the temperature is taken so high as to produce corundum, which is not practically feasible. The grog, however, contains a surplus of silica, which ultimately produces a glassy matrix of high viscosity and high fusion point. A portion of this glass probably combines with some of the excess alumina of the bond, producing more crystals of alumina silicate, but this does not destroy the separate existence of the particles derived from the grog and the particles derived from the binder, because the grog and the binder are not blended with sufficient intimacy.

These products are physically very different from ordinary diaspore bricks and from ordinary clay bricks, and are much superior to both, in respect to refractoriness, mechanical strength and resistance to changes in temperature. Pure diaspore bricks are very costly and have constant shrinkage in use. The bauxitic clay which I prefer to employ is a cheap commodity and can be burned to a temperature preventing constant shrinkage. By embedding a burned grog of such clay in a binder composed of or containing diaspore according to this invention, the product is little more costly than a product made of clay only, and has nearly the fusion point of diaspore without the constant shrinkage of diaspore.

Diaspore and bauxite have been used considerably in the preparation of refractories of the grog type, but so far as I am aware, these aluminous minerals have been used only as grog, and therefore have been ground to only such fineness as to serve as grog. In my present system, the diaspore or other aluminous mineral is used as a portion of the binder, to add refractoriness and mechanical strength thereto, and is therefore ground to impalpable fineness in the preparation of the binder. The diaspore also offsets the natural shrinkage of the clay ingredient and assists in producing products that will not shrink or crack in use.

The nearest approach to the present system of embedding grog particles in a binder that is more refractory than the grog is found in prior refractories which have been made from grog and a binder which is composed of carefully graded raw portions of the same material composing the grog. In such cases, mechanical strength is sacrificed, because of the tendency of the raw binder to shrink away from the previously burned and shrunk grog, and such a system is expensive because of the necessarily careful grading of the binding material. In the present system, the binder does not have such a tendency to shrink away from the grog.

Another characteristic of the products of the present process is that there is very little difference between the true specific gravity of the material and its apparent or bulk specific gravity. The specific gravity increases with prolonged heating, either during manufacture or during the use of the products, such increase in density being probably due to progressively increasing crystallization of aluminum silicate. On account of this fact, and on account of the fact that these products do not shrink continuously in use, the products are improved structurally and in respect to their refractoriness, by service at high temperature. For best results, these products should contain, on analysis, at least 50% of alumina.

In the appended claims the term "grog" is intended to refer either to the burned material as used as an ingredient in the batch mixture, or to the portions of the finished product which are derived from such grog and which may be partially or wholly transformed into crystalline aluminum silicate and glossy matrix.

I claim as my invention:

1. A refractory body made by burning a mixture of a previously burned bauxitic clay grog and a binder containing bauxitic clay and diaspore.

2. A refractory body composed of grog particles consisting of crystalline aluminum silicate and a glassy matrix, together with a binder consisting of a greater proportion of crystalline aluminum silicate and a less proportion of glassy matrix.

3. A refractory body derived from a mixture of burned bauxitic clay grog, raw bauxitic clay and a much smaller proportion of a raw natural mineral composed mainly of hydrated aluminum oxid, the said body consisting of crystalline aluminum silicate and a relatively small amount of glassy matrix.

4. A refractory body consisting of a grog and a binder both composed of crystalline aluminum silicate and a relatively small amount of glassy matrix, the said aluminum silicate and matrix being derived from bauxitic clay and a natural mineral composed of hydrated aluminum oxid, and said binder containing a greater proportion of crystalline material than said grog.

5. A batch mixture for making refractory bodies containing grog particles of burned natural clay and a finely divided binder composed of natural clay and additional aluminous material.

6. A batch mixture for making refractory bodies containing grog particles of burned natural clay and a finely divided binder composed of the same natural clay, unburned, and additional raw hydrated aluminum oxid mineral.

7. A batch mixture for making refractory bodies containing grog particles of burned bauxitic clay known as G No. 1 Georgia kaolin and a finely divided binder composed of the same bauxitic clay, unburned, and a raw hydrated aluminum oxid mineral.

8. A batch mixture for making refractory bodies composed of burned bauxitic clay, raw bauxitic clay and a raw hydrated aluminum oxid mineral, the aluminous mineral and raw bauxitic clay being in a state of impalpable fineness and the burned clay being in suitable fineness to serve as grog.

9. A batch mixture for making refractory bodies composed of burned bauxitic clay grog, raw bauxitic clay and raw diaspore, the raw clay and diaspore being in a state of impalpable fineness, and the burned clay being in suitable fineness to serve as grog.

10. A batch mixture for making refractory bodies composed of the following ingredients in substantially the proportions stated:

| | Parts |
|---|---|
| Burned bauxitic clay grog | 60 |
| Raw and finely ground bauxitic clay | 30 |
| Raw and finely ground diaspore | 10 |

11. The process of making refractory bodies that comprises burning clay to produce grog, mixing said grog with raw clay and with a relatively small quantity of raw diaspore, forming the mixture into the final articles desired and burning said articles at a temperature in excess of 2700° F.

12. A refractory body composed of particles of grog consisting of burned bauxitic clay, said particles being embedded in a binder which is more refractory than the said grog particles and which is composed of the same kind of bauxitic clay enriched in alumina by the addition of hydrated aluminum oxid mineral.

13. A refractory body consisting of a grog and a binder both composed of crystalline aluminum silicate and a relatively small amount of glassy matrix, the said aluminum silicate being derived from bauxitic clay and a natural mineral composed of hydrated aluminum oxide, which binder contains a greater proportion of crystalline material than said grog, and the said body having a bulk specific gravity of at least 2.45.

14. The process of making refractory bodies in which the derivative of the binder is more refractory than that of the grog, which comprises preparing a grog by grinding bauxitic clay to a fineness of the order of 325 mesh, calcining the clay to temperatures of the order of Cones 26 to 30 or 3002°

F. to 3146° F., crushing the grog thus prepared, and mixing the grog with a binder containing raw bauxitic clay and aluminous mineral ground to a fineness of the order of 325 mesh, dry pressing the mixture into articles, and burning the articles to temperatures of the order of cones 30 to 31 or 3146° F. to 3182° F.

Signed at Hartford, Connecticut, this 12th day of March, 1927.

PAUL G. WILLETTS.